Oct. 19, 1965  G. D. KISH  3,213,187
PREASSEMBLED PIPE COUPLING WITH GROUND CONNECTION
Filed April 22, 1964  5 Sheets-Sheet 1

FIG. 1

Oct. 19, 1965  G. D. KISH  3,213,187
PREASSEMBLED PIPE COUPLING WITH GROUND CONNECTION
Filed April 22, 1964  5 Sheets-Sheet 3

Oct. 19, 1965  G. D. KISH  3,213,187

PREASSEMBLED PIPE COUPLING WITH GROUND CONNECTION

Filed April 22, 1964  5 Sheets-Sheet 5

United States Patent Office 3,213,187
Patented Oct. 19, 1965

3,213,187
PREASSEMBLED PIPE COUPLING WITH
GROUND CONNECTION
George D. Kish, Derrick City, Pa., assignor to Dresser
Industries, Inc., Dallas, Tex., a corporation of Delaware
Filed Apr. 22, 1964, Ser. No. 363,665
10 Claims. (Cl. 174—84)

This application is a continuation-in-part of my copending application Serial No. 759,381, filed September 8, 1958, now abandoned, and of my copending application Serial No. 797,033, filed March 4, 1959, now Patent No. 3,024,130, and of my copending application Serial No. 819,184, filed June 9, 1959, now abandoned, and of my copending application Serial No. 10,597 filed February 24, 1960, now abandoned.

This invention relates to preassembled pipe couplings of the "compression" type, and is also concerned with preassembled couplings of the character indicated which are also precoated to resist corrosion and other deleterious action in service, and to methods and apparatus for precoating the couplings.

In a more specific embodiment, the invention is concerned with a preassembled pipe coupling of the character indicated which has been coated to provide it with protection against the deleterious action of the soil, moisture, electric currents and other adverse conditions normally encountered in service and to a method and apparatus for providing the coupling with such protection prior to delivery to the site of installation.

Pipe lines for the transmission of oil, water, gas and the like are customarily formed from many sections of metallic pipe inter-connected by pipe joint devices which comprise various means for insuring fluid-tight junctions between the adjoining pipe sections while at the same time providing a sufficiently flexible joint to accommodate the normal expansion and contraction of the line under the conditions of service. Compression couplings, for example the well known Dresser couplings, are widely used for this purpose and comprise a sleeve or "middle ring" which is applied over the ends of the adjacent pipe sections, and "followers" which are applied over the pipe sections on each side of the middle ring and are than drawn against the ends of the middle ring by means of bolts. Suitable gaskets placed at the ends of the middle ring are compressed by the action of the followers to provide a fluid-tight seal.

A particular problem exists in this field in connection with the distribution of the couplings to the sites of installation. Compression couplings are used in many and varied areas and on all types of terrain, ranging from urban installations of gas lines and water lines to gas and oil line installations in the prairies and mountains. It will be understood that labor is a very important component of pipe line installation and, in order for manpower to be used most efficiently, it is essential that the installing crews have complete couplings ready for installation at all times regardless of the nature of the area in which they are working. It has been proposed, for example, to ship and distribute the couplings to the installers in a number of separate packages, some containing the middle rings, some containing the followers, some containing the bolts, and some containing the gaskets. If one of these packages should become separated from the others, the entire operation would be brought to a halt since a complete coupling would not be available. Furthermore, even if all packages were on hand, time and man-power are required to bring the various parts of the coupling together into a complete unit ready for installation.

Furthermore, it is well known that pipe lines comprising pipe sections inter-connected by compression couplings are continuously subject to corrosion attack by the destructive action of electric currents. A major practical problem in the construction of pipe lines of this type is, consequently, the adequate protection of the fluid-tight joints between the pipe sections from these destructive agencies. It is of great practical importance to reduce to a minimum the need for repair or replacement of parts, since such maintenance is expensive and time consuming and necessitates costly interruptions in service. It will be understood that corrosion attack of the bolts, which serve to maintain the necessary sealing pressure upon the gaskets notwithstanding the expansion and contraction of the pipes and notwithstanding the flexing of the pipe line in service, is a particularly serious problem. If the bolts fail, sealing pressure is released and leakage results. It has been proposed, therefore, to coat the exterior of the surfaces to be protected with various types of protective coverings, such as bituminous coating compositions, fibrous bitumen-impregnated shields, and the like. Protective coverings of this type are well known and extensively used. However, the protective coating or other protective covering is applied in the field, i.e., the couplings are treated at the side of the trench in which they are to be laid. Either individual couplings are coated and/or wrapped and are thereafter installed, or, coupled sections are treated by means of portable coating and wrapping machines which are moved along the assembled line.

In either method of application the couplings or clamps present a special problem in attaining full protection for the line.

Special methods have, therefore, been devised to protect the joint structure. Methods commonly employed involve the hand application of coatings or suitable wrappings. Such treatment is expensive, time-consuming and not fully satisfactory for the reason that the various projecting surfaces of the coupling or clamp are difficult to reach and to cover with a uniform layer of material by the methods necessarily employed in the field.

If a sufficiently fluid coating composition is used to insure penetration into all of the crevices of the coupling or clamp and thus to permit the desired coverage of all exposed portions, the coating is necessarily so soft that it is unduly susceptible to the abrasive action of the soil. As a result, the coating film is soon injured and the coupling is exposed to attack. In order to avoid this difficulty, it has been proposed to surround the joint and the adjacent pipe ends with a thick layer of a plastic material. Such material, however, requires a bulky, complicated housing for its application. In some cases the housing is removed after the plastic composition, which is poured into the housing as a hot fluid, has cooled and hardened, while in other instances the housing forms a permanent part of the installation. It has been proposed, for example, to assemble the housing around the joint and then to fill the housing with the plastic protective material heated to the extent necessary to render it fluid. A suitable aperture is provided in the top of the housing through which the hot fluid material is poured. The housing aperture is then closed and the coating allowed to cool and harden.

This method of treatment has the disadvantage of being time-consuming and requiring special tools, materials, and relatively skilled labor. Not only is the assembly of the housing a major task but care must be taken in pouring the molten coating composition to drive out all of the air in order that all exposed surfaces of the coupling or clamp will be reached and covered. This requires careful control both of the temperature of the composition and the rate of pouring. Furthermore, the bulkiness of the housing makes it difficult to apply after the pipe has been laid in the trench and working space is limited, a situation which frequently occurs in some types of installation.

Another approach to the problem involves the use of so-called "cathodic-protection" systems which require special, relatively-expensive appliances and need highly-skilled labor for their proper installation. A typical system, for example, requires the burying in the soil of a plurality of "sacrificial" anodes of a metal electronegative to the pipe line structure to be protected. Thus, such sacrificial anodes, usually of magnesium or zinc, are buried in the earth near the pipe line and connected to it by electrical conductors. The resulting flow of current maintains the pipe line cathodic with respect to the soil and reduces corrosion. For proper action it is necessary to bury each sacrificial anode in a prepared bed or backfill designed to control the chemical nature of the anode environment. The difficulty and expense, both in time and skilled man-power, of providing adequate "cathodic-protection" systems will be apparent.

From a practical standpoint, therefore, there are serious difficulties in carrying out the heretofore suggested proposals for protecting pipe joints, more particularly pipe couplings and clamps, against corrosion arising from the flow of electrical currents and resultant chemical reaction, i.e. galvanic action, and from other adverse conditions encountered in service.

It is also known that the gaskets or packing suitable for use in compression couplings are generally formed from rubber or other like resilient, electrically-insulating material. As a result, the couplings tend to interfere with the free flow of electrical current through the pipe line and in some cases the flow of current is stopped entirely or reduced to a negligible value. Ordinarily the electrically-insulating properties of the couplings are of no concern and the fluid-tight, flexible connection which the couplings provide between the pipe sections satisfies the user's requirements. In some cases, however, it is desired to ground electrical wiring installations or electrical machinery to the pipe line. In this case, of course, it is desired that the pipe have as efficient an electrically-conductive path as possible, and compression couplings which interrupt this conductive path are disadvantageous. In such cases, it has been necessary to provide a conductive line between adjacent pipe sections which by-passes the compression coupling or to provide some other means to form an electrically-conductive path around the coupling. Such arrangements add to the complexity and cost of the installation and greatly slow down the installation time. Furthermore, they are difficult to employ in cases in which space is at a premium and care must be taken to accommodate excessive expansion and contraction of the line.

It is an object of the present invention to provide a preassembled coupling of the compression type which is adapted to be shipped in preassembled form and to be "stabbed," i.e., directly applied without disassembly, upon the ends of the pipe sections to be coupled.

It is another object of the invention to provide a coupling of the character indicated which is precoated and is adapted to be installed upon the ends of pipe sections to be coupled in the field with minimum installation time and with minimum application of protective coating at the site of installation.

It is a further object of the invention to provide a preassembled, precoated coupling which provides a path for the flow of electrical currents through the coupling from one of the coupled pipes to the other.

It is another object of the invention to provide a method for precoating the coupling to render it ready for immediate use in the field without the complex coating operations heretofore employed.

In accordance with the present invention, there is provided a coupling which is a preassembled unit ready for immediate installation and which comprises a sleeve or middle ring having pipe-receiving openings fitted with sealing gaskets, and gasket followers and bolts adapted to apply sealing pressure to the gaskets, the entire assembly being enclosed within a multiple coating comprising a primer coating and an outer coating of bituminous enamel. In its preferred form, the coupling is constructed to be electrically conducting and is coated in selected areas with a release agent to facilitate movement of the movable parts of the coupling when the bolts are drawn up to seal the coupling upon the pipes at the time it is installed.

In accordance with the method of the present application, all of the steps of which are adapted to be carried out in a manufacturing plant before the coupling is shipped to the site of installation, the several parts of the coupling, i.e., the middle ring, the gaskets, the followers, and the follower bolts, are first preassembled with the nuts on the bolts finger-tight and with the gaskets seated in the gasket recesses at the ends of the middle ring. Then the thus-assembled coupling is coated with a primer coating which is suitably applied by spraying, and the primed coupling is then heated and immersed in a bath of bituminous enamel to provide it with an outer coating, and the completely coated coupling then is allowed to dry. Preferably, the threaded ends of the bolts are coated with the release agent prior to application of the primer to the coupling and release agent is similarly applied between the middle ring and each of the followers prior to application of the primer. Alternatively, the threaded ends of the bolts and the nuts are suitably enclosed within hoods or sleeves after the primer is applied to the coupling but before it has the final coating of bituminous enamel applied to it. The assembled coated coupling, which is the product of the above-described method, is ready for immediate application in the field.

It is a feature of the invention that the need for assembling the parts of the coupling at the site of installation is eliminated.

It is another feature of the invention that the couplings do not need to be coated or wrapped at the site of installation except for possible "touch-up" coating.

It is a further feature of the invention that the coupling may be applied to the pipes with which it is to form a fluid-tight joint merely by "stabbing" the pipe ends into the coupling and tightening the follower nuts.

It is another feature of the invention that the coupling may be installed with minimum labor and time.

Other objects and features of the invention will be apparent to those skilled in the art from the following detailed description of illustrative embodiments of the invention and from the accompanying drawings, wherein.

Figure 1:
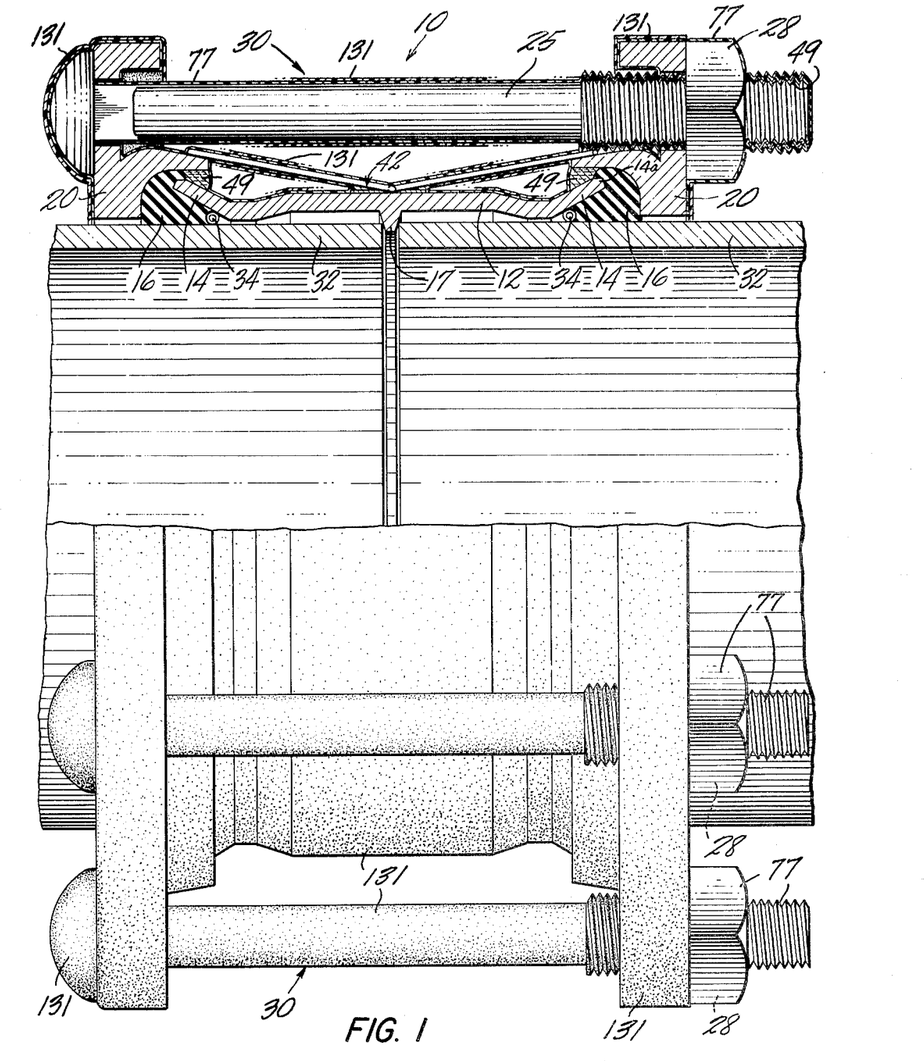
FIG. 1 is a side elevational view, partly in section of a coupling embodying features of the present invention, with the coupling shown in installed position upon a pair of opposed pipe sections.
Figure 2:
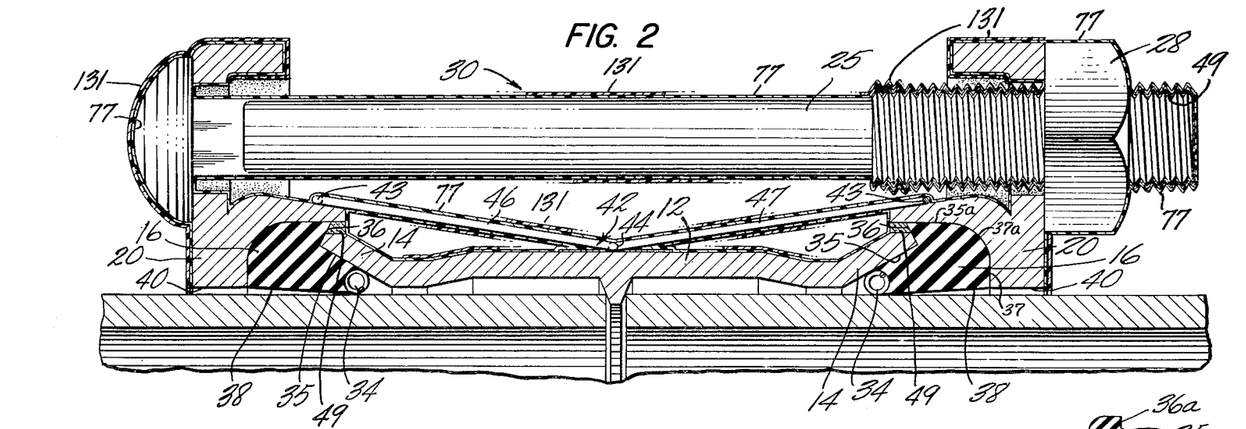
FIG. 2 is a similar view of the coupling on an enlarged scale but with the bottom portion omitted for ease of illustration, the parts of the coupling being shown in finger-tight position before the nuts are drawn upon the bolts to seal the coupling to the pipes.

Referrings to the drawings, and more particularly to FIGS. 1 and 2, there is shown a so-called "compression" coupling adapted to form a fluid-tight joint between opposed sections of plain-end pipe. The coupling, which is designated generally by the reference numeral 10, comprises a cylindrical sleeve or "middle ring" 12 having end portions 14 flared out at an angle of about 30° to define annular recesses for reception of the axially inner ends of gaskets 16. A rib or stop 17 serves to facilitate centering of the sleeve upon the pipe sections. The gaskets 16 are forced under pressure against the ends of the middle ring 12 by means of "followers" 20 which are annular in form, as shown in FIG. 1. The followers 20 are drawn toward the center of sleeve 12 to apply sealing pressure to the gaskets by means of bolts 25 having associated nuts 28 threadedly engaged therewith. The relationship of parts when the coupling is assembled and provided with a multiple protective coating 30 in accordance with this invention is shown in FIG. 2 and the corresponding relationship when the nuts 28 are tightened upon bolts 25 after the coupling has been installed upon pipes is seen in FIG. 1, wherein the gaskets have been forced to conform to the surfaces between which they are confined, the compressing force upon the gaskets being maintained throughout the circumference of the coupling by the cooperating action of the bolts and nuts. It will be understood that the greater the pressure of the fluid flowing through the pipes, the greater the force which must be applied by the bolts and nuts to insure sealing of the coupling by the gaskets.

Each gasket is preferably formed as a continuous endless ring although it may be split if desired. The gasket 16 is formed from rubber or rubber composition, these terms being used generically to include natural and synthetic rubbers and other elastomeric compounds or compositions having like properties and characteristics. The material is relatively firm and solid but sufficiently resilient and elastic to flow under pressure to conform to the surfaces between which it is confined. Preferably the rubber composition of the gaskets has a durometer rating of 75 plus or minus 5. When the couplings are to be used on lines subjected to hydrocarbon fluids, the gaskets are preferably formed from a rubbery composition which is relatively resistant to attack by hydrocarbon gases and oils. Examples of such resistant rubbery compositions suitable for use with the coupling of the present invention are neoprene (polychloroprene) and butadiene-acrylonitrile copolymers, such as those known commercially by the trade designations Buna-N or GR-A. My gasket is not limited to these specific materials, however, and particularly when special resistance to hydrocarbon gases and oils is not required, any rubbery composition having the above-noted characteristics may be employed. The axially inner end or "toe" of the gasket is suitably provided with an expansible metallic ring or helix 34. The helix 34 not only prevents undesired extrusion of the material of the gasket but it also provides an electrically conductive bridge between the pipe sections and the sleeve or "middle ring" 12 of the coupling or "middle ring" 12 of the coupling 10. The expansible ring 34 is preferably combined with the gasket 16 in a single unitary structure and is shown in the form of an annular armour helix which is molded into the rubber composition of the gasket. This helix is suitably of the form shown in Pfefferle U.S. Patent 1,984,806.

As seen in FIG. 2, the gasket 16 has a generally wedge-shaped or trapezoidal cross sectional shape with a conical or tapered outer surface 35, positioning shoulder 36, outer peripheral surface 35a, outer end surface 37 and inner peripheral surface 38. The conical surface 35 conforms to the flared end portions 14 of the sleeve 12 and hence has a taper of about 30° to the longitudinal axis of the coupling. The shoulder 36 engages the end edge 14a (FIG. 1) of the flared portion of the sleeve 12 and is preferably perpendicular to the surface 35. It hence forms an angle of about 60° to the coupling axis. The inclined surface 35 and shoulder 36 thus define an annular groove receiving the end of the sleeve 12. The apex of the groove is located about 50% to 75% of the radial distance from the inner surface 38 and outer peripheral surface 35a and about 60% to 75% of the axial distance from the outer end face 37 and the apex of the gasket as defined by the helix 34. The outer peripheral surface 35a of the gasket is approximately cylindrical and the outer end face 37 is approximately radial, the surfaces 35a and 37 being joined by a radius 37a and conforming to the corresponding inner surfaces of the follower 20.

By reason of this construction, the gaskets are securely locked in place and are held in centered position relative to the middle ring 12 and followers 20 even when the nuts 28 are only finger-tight. Hence, the coupling may be handled and shipped without disturbing the position of the gaskets. Moreover, the gaskets are securely held against displacement by engagement of the pipe ends when the latter are stabbed into the preassembled coupling. Were it not for this feature, the tapered gaskets would be wedged between the pipe and the tapered surface of the flared-end sleeve 12 to block entry of the pipe. If the pipe were to be forced in despite this wedging, cutting or other damage to the gasket would result. In this connection, the feature that the gasket is maintained concentric with the middle ring and thereby maintains the follower also centered not only facilitates stabbing of the pipe into the coupling without displacing or damaging the gasket but has the further important advantage that it assures uniform distribution of rubber around the pipe when the coupling is tightened and thereby provides uniform gasket pressure without high spots and low spots.

As previously indicated, an important feature of the preassembled coupling of this invention is that it is adapted to have the pipes "stabbed" into it at the time of installation, i.e., it does not have to be disassembled in order to install it, and the coupling can be immediately installed as a preassembled unit with minimum labor. For this purpose, the gaskets 16 not only engage against the outer edge of the flared end of the middle ring, as described above, which prevents them from being pushed axially inwardly, but their pipe-receiving aperture defined by the radially inner surface 38 has a diameter which has a critical, predetermined value greater than the maximum outside diameter of the pipe to be coupled.

In order to permit the ends of pipe section to be "stabbed" into the preassembled coupling without disassembly or loosening of the bolts, it has been found that such stabbing can be achieved without displacement of the gaskets by providing the gaskets with locating shoulders as described above and by maintaining a critical relationship between the size of the pipe-receiving aperture defined by the radially inner surface 38 and the outside diameter of the pipe to be coupled. If the pipe-receiving aperture of the gasket is too small, the pipe sections cannot be stabbed into the preassembled coupling without displacing and possibly damaging the gaskets. If, on the other hand, the pipe-receiving aperture of the gasket is too large, a satisfactory fluid-tight seal cannot be obtained. Thus, the size of the pipe-receiving aperture of the gasket with relation to the outside diameter of the pipe is highly critical.

The criticality of the gasket size is further complicated by the fact that the outside diameter of commercial pipe may vary between a minimum value and a maximum value. Hence, when a coupling is designed for a pipe of a given size, the gasket must be large enough to accept pipe of maximum outside diameter and yet provide a satisfactory seal with pipe of minimum diameter. The following tabulation indicates the permissible variation in pipe dimensions and the proper gasket size for each size of pipe:

*Table I*

| Nominal size of pipe, inches | 2 inches | 4 inches | 6 inches | 8 inches | 10 inches | 12 inches |
|---|---|---|---|---|---|---|
| Mean O.D. of pipe | 2.375 | 4.5 | 6.625 | 8.625 | 10.75 | 12.75 |
| Max. O.D. of pipe (+1%) | 2.399 | 4.545 | 6.691 | 8.711 | 10.858 | 12.878 |
| Min. O.D. of pipe (−1%) | 2.351 | 4.455 | 6.559 | 8.539 | 10.642 | 12.622 |
| I.D. of gasket | 2.437 | 4.573 | 6.723 | 8.733 | 10.869 | 12.929 |
| Axial length of gasket | .845 | .845 | .938 | .938 | .938 | .938 |
| Radial thickness of gasket | .573 | .504 | .534 | .549 | .549 | .518 |

The values of gasket size given in the table provide a satisfactory factor of safety and will provide a seal even if the outside diameter of the pipe is somewhat smaller than the specified minimum diameter. The following tabulation gives the results of tests made to determine the minimum outside diameter of pipe with which a seal meeting pipe specifications could be obtained:

*Table II*

| Nominal size of pipe, inches | 2 inches | 6 inches | 12 inches |
|---|---|---|---|
| I.D. of gasket | 2.437 | 6.723 | 12.929 |
| Min. O.D. of pipe with which seal is obtained | 2.0 | 6.315 | 12.445 |
| Clearance between pipe and gasket | .437 | .408 | .484 |

From test data and from experience in use, it has been found that the diameter of the pipe-receiving aperture of the gasket should exceed the mean outside diameter of the pipe of the nominal size of which the coupling is intended by an amount between 1% and 3%, but not more than ½ inch for the range of pipe sizes from 2 to 12 inches. It has further been found that the other dimensions of the gaskets are important in obtaining a proper seal while still having a gasket with a pipe-receiving aperture large enough to permit stabbing of the pipe into a preassembled coupling. As will be seen from Table I above, the axial and radial dimensions of the gasket cross section do not vary in proportion to the diameter of the pipe. In the range of sizes from 2 to 12 inch pipe, the radial thickness of the gasket preferably is substantially constant with a value between 0.4 and 0.75 inch and preferably between 0.5 and 0.6 inch. The axial dimension of the gasket increases slightly with an increase in the diameter of the pipe, but should be in the range of .75 to 1.25 inch and preferably between 0.9 and 1.00 inch. With the clearance between the gasket and the pipe as indicated above, it has been found that these cross sectional dimensions of the gasket insure a seal meeting pipe specifications.

In order further to facilitate the stabbing of pipe into the preassembled couplings, it is desirable for the pipe-receiving apertures of the gaskets to be tapered inwardly. The taper has been exaggerated in the drawing in order to make clearly visible, but ordinarily should be in the range of 2° to 5° with reference to the longitudinal axis of the coupling. When the pipe-receiving aperture of the gasket is tapered, the minimum diameter should have a value within the range specified above. The pipe-receiving apertures of the follower and middle ring should be substantially the same as that of the gasket.

Figure 2A:
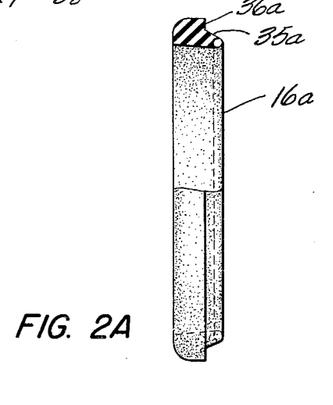
FIG. 2A is a sectional view of a modified form of gasket.

While the form of gasket shown in FIGS. 1 and 2 is preferred, the gasket may be modified somewhat if desired. Thus, as shown in FIG. 2a, the annular groove in the axially outer wall of the gasket may define an obtuse angle rather than a right angle. The resulting gasket 16a will thus have a tapered bearing surface 35a corresponding to surface 35 of gasket 16 and a radially extending surface 36a providing a shoulder substantially perpendicular to the axis of the gasket. The surface 38 of the pipe-receiving aperture of the gasket is tapered inwardly as described above.

Figures 6, 7, 8:
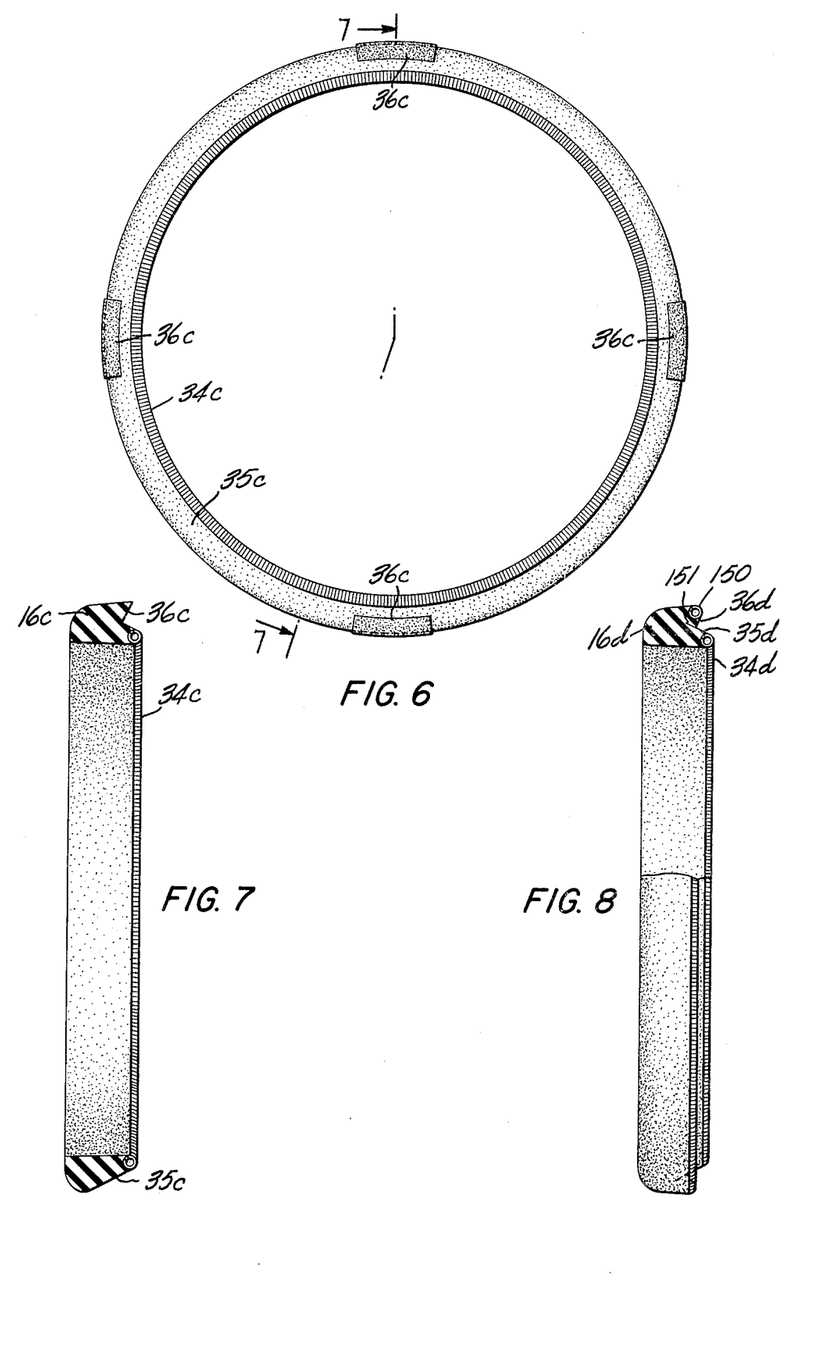
FIG. 6 is an end view of a gasket showing a discontinuous gasket-locating shoulder.
FIG. 7 is a cross section on the lines 7—7 in FIG. 6.
FIG. 8 is a side view partially in section of another gasket.

In FIGS. 6 and 7, there is illustrated a further embodiment in which a gasket 16c has a tapered bearing surface 35c and a shoulder 36c which, instead of being a continuous annular shoulder, is made up of a plurality of circumferentially spaced sections. The discontinuous shoulder thus provided, has been found to position the gasket and to maintain it in position during the stabbing of pipe sections into the preassembled coupling while, at the same time, facilitating contraction of the gasket and the flow of gasket material that is necessary to provide a satisfactory fluid-tight seal when the bolts of the coupling are tightened.

A further embodiment shown in FIG. 8 in which a gasket 16d is provided with a second expansible middle ring or helix 150 at the intersection of the shoulder 36d and the outer periphery of the gasket. The gasket 16d is further provided with an oblique slit 151 which has a length of approximately 25% of the axial dimension of the body of the gasket and is in line with the tapered surface 35d. Advantageously, the length of the slit is 20% to 50% of the axial dimension of the body portion of the gasket. The slit has the advantage that it permits the axially inner portion of the gasket to move radially inwardly as well as axial inwardly more readily when the bolts of the coupling are tightened. It will be understood that the several features of the gasket as shown and described are mutually interchangeable in the different embodiments. Thus, for example, the gaskets shown in FIGS. 6 and 8 may have pipe-receiving apertures that are tapered as described above with respect to the gasket shown in FIGS. 1 and 2.

Figure 2B:
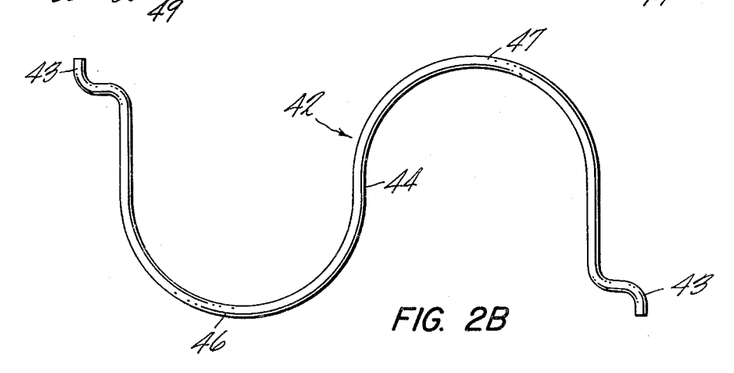
FIG. 2B is a plan view of a wire coil which provides an electrically-conductive connection between the middle ring and followers of the coupling.

To complete the coupling and give it desirable electrical characteristics, there is provided a bond wire 42 which is conveniently in the form of a reverse loop as shown in FIG. 2B. Thus, the bond wire 42 has ends 43 and a central portion 44 between the two opposite loops 46 and 47. In uniting the bond wire with the coupling to provide an electrically conducting connection between the middle ring and the followers, so that they will be at the same potential, the ends 43 are welded to the followers 20 and the central portion 44 is welded to the surface of the middle ring. By reason of the presence of the loops 46 and 47, the bond wire has flexibility to accommodate the relative movement between the followers and the middle ring when the nuts are tightened on the bolts during installation of the coupling.

In preparing a preassembled, pre-coated coupling in accordance with this invention, the metal parts of the coupling are first freed from grease, oil, dirt, rust, scale and the like in conventional manner, using the techniques commonly employed in the preparation of surfaces for the application of bituminous compositions in the pipe-coating art. The threaded ends of the bolts are coated with a release agent, e.g., by dipping them into a body of the release agent 49 heated to a sufficiently high temperature to make it fluid. The amount of release agent retained on the threads of the bolts is preferably such that the grooves of the threads are approximately half full while the crests of the threads have only a thin surface coating. The coupling is then assembled by seating the gaskets in the gasket recesses of the middle ring, applying the followers, and turning the nuts upon the bolts until they are finger-tight. The bond wire is then welded in place to interconnect electrically the followers and the middle ring. Release agent is applied between the middle ring and each of the followers, for example with a brush or with a caulking gun, and preferably fills the small space between the inner flange of the follower and the outwardly flared end portion of the middle ring. On couplings in which the bolts lie close to the middle ring a band of release agent about three quarters of an inch wide is applied to that portion of the middle ring directly underlying each bolt. The release agent is conveniently applied before the bolts are inserted but it may be applied after insertion of the bolts.

The thus-prepared coupling is then coated at room temperature, e.g., 65–80° F., with a primer coating. A primer coating is one which serves to improve the retention of a superposed final coating upon the supporting surface which is being coated. Accordingly, a primer may be used which will have this function and will provide an effectively adhering coating upon the coupling. Particularly suitable and preferred are primers of a thermosetting nature, e.g., those containing thermosetting resins or resin-forming materials and preferably those containing thermosetting components in combination with coal tar pitch components. Particularly suitable and distinctly preferred is a primer composition comprising a coal tar pitch containing epoxy resins. The primer coating is applied by any convenient means but preferably it is applied by spraying to provide a coating of a thickness of ½ to 5 mils over all surfaces to be coated. The coupling with its thus-applied coating of primer is then substantially immediately heated to effect a partial curing of the coating composition but heating is discontinued before the composition has fully cured and before it has become dry to the touch. Then, with its primer coating partially cured and still wet to the touch, the coated assembled coupling is substantially immediately immersed for a few seconds in a molten bath of the coal-tar enamel composition. Thereupon, the article is withdrawn from the molten coating bath and rotated above the bath until the coal-tar enamel coating has congealed sufficiently that it no longer flows upon continued rotation of the article. The article with its thus-applied plural-phase coating is then allowed to cool to room temperature.

The coal-tar pitch-epoxy resin composition which is preferably employed as the primer in carrying out the process of this invention is suitably composed of 15 to 50 parts of epoxy resin and 50 to 85 parts of coal-tar pitch based on 100 parts by weight of the total content of resin and pitch. Coal-tar pitch-epoxy resin compositions suitable for use are those described, for example, in Whittier et al. U.S. Patent No. 2,765,288 of October 2, 1956. A particularly suitable composition of this type is that sold under the trade-name "Tarset" by the Pittsburgh Coke and Chemical Co.

As described in the Whittier et al. patent, the epoxy resins employed correspond with those described in U.S. Patent No. 2,528,417 of October 31, 1950, and U.S. Patent No. 2,500,449 of March 14, 1950. Coal-tar pitch is a product obtained from the distillation of coal-tar and typical coal-tar pitches are described, for example in the book entitled "Asphalts and Allied Substances," by Herbert Abraham (5th Ed.).

The solvents which are employed to produce suitable coating fluidity in the coal-tar pitch-epoxy resin composition are aromatic solvents, suitably those derived from coal-tar, and particularly useful is so-called "high-flash naphtha" which is a mixture of aromatic hydrocarbons generally boiling within the range of 150 to 200° C. Other aromatic solvents such as benzol, toluol and xylol, and the like, may also be used.

As described in U.S. Patent No. 2,765,288, the coal-tar pitch-epoxy resin composition must be mixed with a curing agent or catalyst just prior to use and any of the well-known epoxy resin catalysts or curing agents may be employed such as those described in chapters 2, 3, 4, and 5 of the book entitled "Epoxy Resins—Their Application and Technology," by Henry Lee and Kris Neville (McGraw-Hill Book Company). Suitable catalysts, for example, are poly-functional amines, such as ethylene diamine, ethylene triamine, diethylene triamine, benzyl dimethylamine, 3-dimethyl-aminopropylamine, 3-diethyl-aminopropylamine, tetraethylene pentamine, and the like. These curing agents are conveniently employed in the amount of 0.05 to 0.25 parts per part by weight of the total composition. As shown in Examples I to IV of U.S. Patent No. 2,765,288, the curing agent may be added to a mixture of all of the other components of the composition, or it may be premixed with the coal-tar pitch, or with the coal-tar pitch and solvent, or with the coal-tar pitch, solvent and filler, so long as the epoxy resin and the curing agent are not together prior to the time the composition is prepared for prompt use.

The pipe enamel which is employed in accordance with this invention for application to a freshly-applied wet coating of the primer is preferably so-called "water-works enamel" but any of the other well-known pipe enamels commercially available may be suitably used. Water-works enamel meets the following specification of the American Water Works Association which is set forth in Standard Specification AWWA C203–57.

*Table I.—Characteristics of AWWA coal-tar enamel*
STEEL PIPE COATINGS

| Test | Minimum | Maximum |
|---|---|---|
| Softening point, °F—ASTM D36–26 | 220 | |
| Filler (ash), percent—ASTM D271–48 | 25 | 35 |
| Fineness filler, through 200 mesh, percent—ASTM D546–41 | 90 | |
| Specific gravity at 25° C.—ASTM D71–52 | 1.40 | 1.60 |
| Penetration—ASTM D5–52: [1] | | |
| At 77° F., 100 g. weight, 5 sec | 10 | 20 |
| At 115° F., 50 g. weight, 5 sec | 15 | 55 |
| High-temperature test at 160° F. (sag), in.—AWWA C203, Sec. 2.4.4(1) | | ²⁄₃₂ |
| Low-temperature test at 20° F. (cracking)—AWWA C203, Sec. 2.4.4(2) | | none |
| Deflection test [2] (initial heating)—AWWA C203, Sec. 2.4.4(3): | | |
| Initial crack, in | 0.8 | |
| Disbonded area, sq. in | | 3.0 |
| Deflection test [2] (after heating)—AWWA C203, Sec. 2.4.4(4): | | |
| Initial crack, in | 0.6 | |
| Disbonded area, sq. in | | 5.0 |
| Impact test [2] at 77° F., 650 g. ball, 8 ft. drop—AWWA C203, Sec. 2.4.4(6): | | |
| Direct impact, disbonded area, sq. in | | 10.0 |
| Indirect impact, disbonded area, sq. in | | 2.0 |
| Peel test—AWWA C203, Sec. 2.4.4(5) | ([3]) | ([3]) |

[1] For anticipated minimum temperature exposures between 20° and −20° F., use enamels with penetration of 15 to 20 at 77° F.
[2] Choice of bond testing methods A or B by deflection (before heating), by deflection (after heating), or by impact shall depend upon laboratory equipment available.
[3] No peeling.

Pipe enamels are generally characterized by the limits of temperature which they will resist without disbonding in normal service without excessive deterioration and these enamels are accordingly commonly referred to as "narrow range" enamel, "moderate range" enamel, and "wide range" enamel. The above-described water works enamel is a form of wide-range enamel. The following typical specifications for pipe enamels are set forth, for example in the article by Normal T. Shideler entitled "Coal-Tar Coatings for Protection of Underground Structures," which appears in the June 1957 issue of the periodical "Corrosion."

Table II.—Typical specifications

COAL TAR HOT APPLIED COATINGS

| Test | Narrow range enamel | Moderate range enamel | Wide range enamel | AWWA enamel C203-4 [1] | Hot pipe-line enamel |
|---|---|---|---|---|---|
| Specific gravity at 25° C | 1.45-1.55 | 1.40-1.50 | 1.40-1.50 | 1.40-1.50 | 1.40-1.50 |
| Softening point, degrees F.—ASTM D-36 | 190-200 | 195-205 | [2] 220 | [2] 220 | [2] 240 |
| Penetration—ASTM D-5 | | | | | |
| 100 g., 5 sec., 77° F | 0-2 | 2-6 | 7-11 | 10-20 | 1-3 |
| 200 g., 5 sec., 77° F | | | | | 2-6 |
| 50 g., 5 sec., 115° F | 2-8 | 8-20 | 14-28 | 15-55 | 5-15 |
| Ash, mineral filler, percent by weight | 20-25 | 20-25 | 20-25 | 25-35 | 25-35 |
| Sag test: | | | | | |
| 7 hrs. at 120° F | [3] 1/16″ | | | | |
| 7 hrs at 140° F | | [3] 1/16″ | | | |
| 24 hrs. at 160° F | | | [3] 1/16″ | [3] 1/16″ | |
| 24 hrs. at 180° F | | | | | [3] 1/16″ |
| Cold cracking test: | | | | | |
| 5 hrs. at 30° F | None | | | | |
| 5 hrs. at 0° F | | None | | | |
| 5 hrs. at −10° F | | | | | None |
| 5 hrs. at −20° F | | | None | None | |
| Spark Test: | | | | | |
| 10,000 volts | | | | | |
| Low amperage | None | None | None | None | None |

[1] Now superseded by AWWA C205-57 set forth above.
[2] Maximum.
[3] Minimum.

As indicated in the above-mentioned "Corrosion" article, a particularly effective pipe enamel having valuable temperature characteristics is formed from so-called "coal-digestion pitch." The preparation of a pipe enamel with coal-digestion pitch is described in Canadian Patent No. 396,904. Typical pipe enamels falling within the above-indicated specifications for AWWA water-works enamel and formed from coal-digestion pitch, straight distilled coal-tar pitch, or both, have the following characteristics:

| | Coal-digestion pitch | Straight distilled coal-tar pitch | Mixture of coal-digestion pitch and straight distilled pitch |
|---|---|---|---|
| Penetration at— | | | |
| 32° F | 3.0 | 0.0 | 0.0 |
| 75° F | 10.0 | 0.5 | 2.0 |
| 115° F | 21.5 | 4.0 | 7.0 |
| Fusing point (cube), ° F | 258 | 210 | 246 |
| Flash point (open-cup), ° F | 345 | 350 | 348 |
| Ash (300 mesh mica), percent | 27.2 | 31.3 | 25.9 |
| Insoluble in benzol, percent | 51.7 | 46.0 | 55.7 |

These compositions are described on page 595 of volume 1 of "Asphalts and Allied Substances," by Herbert Abraham (5th ed.).

The preparation of coal-digestion pitch itself is described, for example, on page 531 of the above-identified book by Abraham and typical coal-tar pitch manufacturing procedures are described in U.S. Patents 2,124,843 (B. A. Anderton, of July 26, 1938), 2,174,184 (W. McK. Bywater, of September 26, 1939) and 2,249,412 (F. W. Yeager, of July 15, 1941).

The release agent is a heavy oil derived from coal-tar and thus has common characteristics with the coal-tar enamel and with the coal-tar pitch containing primer which is preferably employed. A typical example of a release agent is referred to commercially as "80–90 high boiling oil" and is obtained by distillation of coal-tar at distillation temperature in the range of 300–400° C. A specific form of this heavy oil, for example, has the following characteristics:

Specific gravity at 38° C./15.5° C. (ASTM D-368) 1.140 minimum, 1.170 maximum.

Distillation under ASTM D-246:

| | Min. percent | Max. percent |
|---|---|---|
| Distillate to 300° C | 0 | 3 |
| Distillate to 355° C | 10 | 40 |
| Distillate to 400° C | 40 | 60 |

Percent water (ASTM D-95) not more than 2% maximum.

Benzene Insoluble (ASTM D-367) not more than 1.0%.

In applying the above-described plural-phase protective coating, the coupling surfaces to be coated are, as mentioned, first suitably cleaned by washing with an aromatic solvent, such as xylol, and wiping them with clean rags to remove oil and grease. The surfaces are then sand- or grit-blasted or wire-brushed to remove any rust, scale, paint, and the like which may be present. The preparation of the surfaces to receive the first coating is suitably carried out at room temperature, as in the application of the release agent. The primer is then sprayed upon the clean surface while it remains at room temperature and heating of the coupling being coated at this stage is not generally necessary. However, if the coupling has been stored at substantially lower temperatures prior to being coated, it is advantageously allowed to come to room temperature before the first coating is applied. Application of the primer composition is suitably effected by spraying, using spraying means of any convenient type such as sprayers commonly used in the application of bituminous coatings. Spraying is continued until a coating has been applied to all surfaces to be protected in a thickness of ½ to 5 mils. As previously mentioned, when a coal-tar pitch-epoxy resin primer composition is used it is prepared for application by incorporating the curing agent with the remaining components of the product. The curing agent should be added just prior to use and, in any case, the composition should be applied to the surface to be treated within 6 hours at room temperature from the time the curing agent is combined with the epoxy resin.

Substantially immediately after the coal-tar pitch epoxy resin composition has been sprayed upon the coupling the coated coupling is heated by bringing it into contact with air or other gas or gas mixture heated to a temperature of 300 to 650° F., preferably 450 to 500° F. Before being heated and coated with coal-tar enamel, however, the free ends of the bolts 25 and the nuts 28 are covered with a cap 48 shown in FIG. 3. The cap 48 is suitably formed from polyethylene, rubber, or like material and prevents application of the coal-tar enamel to these portions of the coupling to facilitate later use of a wrench when the coupling is installed. The coated coupling is subjected to the action of the heated air for a time sufficient to effect partial curing of the composition but leaving it "wet to the touch." By the expression "wet to the touch" I mean to include the condition in which the underlayer will partially transfer to another object which may come into contact with it as well as the condition in which the underlayer is merely tacky and does not transfer.

While the time the coated article is subjected to the heated air will vary with the temperature, the weight of the coupling and the thickness of the walls of the coupling, the time suitable for each particular type of article can be readily determined by simple routine test. When an epoxy-resin coal-tar pitch primer is used, for example, the heating time is suitably between 1 minute, 20 seconds and 1 minute, 35 seconds depending in part on the temperature of the couplings prior to heating. It has been found that with a higher ambient temperature, for example 80° F. instead of 40° F., a slightly shorter heating time is required. Heating time in the above range is desirable in order to cure the coal-tar pitch epoxy resin primer coating to the desired amount.

Preferably, the heated air which is employed in the preceding step contains carbon monoxide and carbon dioxide in the following percentage ranges:

Carbon monoxide, 2 to 12%, e.g., 8%.
Carbon dioxide, 2 to 12%, e.g., 4%.

Substantially immediately following the above-described heating step, the coated coupling is immersed in a body of the molten bituminous coating to be applied, e.g., a coal-tar pitch enamel, maintained at a temperature of 450° F. to 525° F., e.g., 485° F. The primer composition is still wet when immersed in the molten bituminous composition and the coupling is immersed for a time sufficient for the article to pick up a coating of $1/16$ to $1/8''$ thickness, e.g., $3/32''$ thickness. This generally involves a time of 2 to 5 seconds and a $3/32''$ coating is obtained in about 4 seconds. It will be understood, therefore, that the immersion in the coal-tar enamel takes place rapidly. The coated coupling is then withdrawn from the coal-tar bath and rotated above the bath until the coating has congealed to a point that it no longer flows. The air temperature above the coal-tar bath is about 200 to 250° F. and the congealing period is about 45 seconds. The primer coating acts as an insulator between the molten coal-tar enamel and the metal of the coupling being treated so that the heat of the enamel is not dissipated into the metal too quickly and as the coal tar enamel congeals, the final curing of the primer coating proceeds simultaneously by reason of the heat supplied by the bituminous outer coating. The congealing of the coal-tar enamel begins immediately upon withdrawal of the article from the molten bath and the simultaneous interaction between the two coating compositions provides a highly effective bond and a coated product is obtained which is effectively protected in service notwithstanding low temperature conditions which have led to the failure of previously proposed coatings. The fact that the primer composition is still wet and slippery when the outer bituminous coating is applied contributes to the eventual bond.

After the outer coating of coal-tar enamel has congealed so that it no longer flows, the coated article is removed from above the coating bath and is allowed to cool to room temperature to complete solidification of the coal-tar enamel and curing of the primer coating into a unitary two-phase coating of outstanding resistance to damage or disponding in service, particularly service to which pipes and pipe couplings are subjected.

The process described above may be carried out in any convenient apparatus used for the handling of couplings and like articles in conventional coating and treating procedures and the process is not limited to any particular form of apparatus. For example, the article to be treated may be fastened to a supporting fixture suspended from an overhead chain conveyor and transported to a first station provided with a plurality of spray nozzles from which the primer composition is sprayed upon all surfaces of the article to be protected. After spraying, the article may move on, carried by the same conveyor, to a heating station which may be an enclosure of sufficient size to contain the largest coupling to be treated. From the heating station, the coupling is again conveyed, as by the overhead chain conveyor, to the bitumen coating bath which may be in the nature of a vertically movable dipping tank into which the article is dipped for the necessary few seconds and is then held above the tank and rotated during the initial congealing period by means of a friction wheel on the supporting fixture in contact with a motor driven belt. The dipping tank is, of course, provided with the necessary insulation and heating means to maintain the body of molten bitumen at the desired temperature and with an inlet for continuously replenishing bitumen as it is used up. The article with its congealed outer coating is then suitably conveyed by an overhead chain conveyor or the like to a final cooling station prior to removal and shipment. It will be apparent from the foregoing that the article moves relatively rapidly through the entire series of processing steps and that there is need for no substantial interval between the several treating stations. Consequently, the process is particularly adapted for continuous operation and the treating apparatus can, therefore, be compact and no large storage areas for maintaining a supply of the articles between treating stages is necessary.

Figure 3:
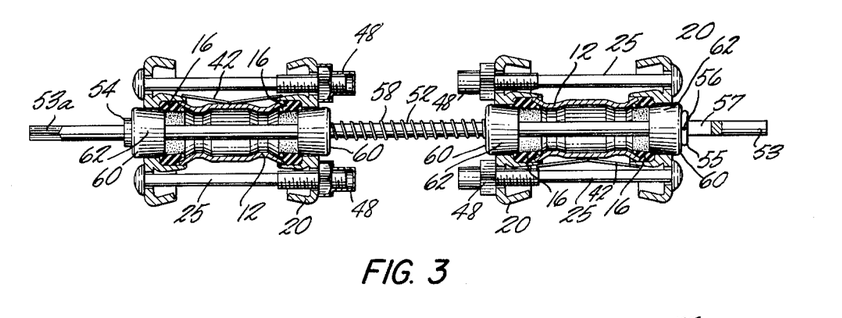
FIG. 3 is an elevational view showing a pair of couplings mounted on a carrier rod assembly prior to being coated.

In order to facilitate the handling of the assembled coupling during the coating operations, there is advantageously provided a supporting assembly such as shown in FIG. 3. This assembly comprises a rod 52 of relatively small diameter compared with the diameter of the sleeve 12 of the coupling, the rod 52 having a cylindrical end 53 and an opposite flattened end 53a. Adjacent end 53a there is provided a fixed stop 54 and adjacent end 53 there is formed a movable stop consisting of an arm 55 pivoted at 56 in a slot 57 in the body of rod 52. A coil spring 58 is slidably mounted on the rod 52, as are closure blocks 60. The closure blocks 60 have a conical surface 62 and are dimensioned to be partly received in the pipe aperture of the followers 20 and to engage with the followers to seal the interior of the assembled coupling. To mount the couplings on the supporting assembly it is merely necessary to place the closure blocks 60 in the pipe apertures of the coupling and to slide the rode 52 through the central openings of the blocks 60, which are dimensioned to receive the rod with a sliding fit, with the spring 58 being interposed between the two couplings. The rod is inserted from left to right as seen in FIG. 3, with the movable stop 55 being pivoted to lie axially in the slot 57 during the inserting operation. When the stop 55 is then turned to the position shown in FIG. 3, the spring 58 pushes the couplings firmly against the stops and maintains the coupling in position.

Figure 4:
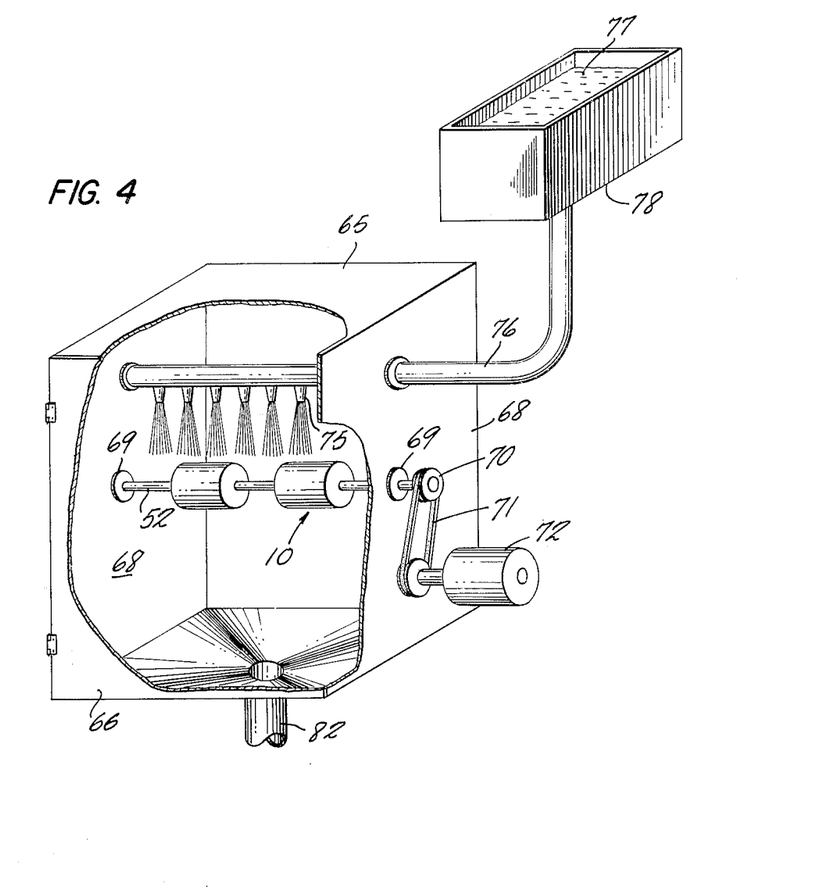
FIG. 4 is a perspective view, partly cut away to show details of construction, of a spray booth containing a coupling assembly such as shown in FIG. 3.

While, as mentioned, the spray device for application of the primer coating may be of any convenient form, advantageously the apparatus shown in FIG. 4 is employed. This apparatus, which is illustrated somewhat diagrammatically, comprises a housing 65 which suitably has a hinged wall 66 to define a door to introduction and withdrawal of the couplings on the above-described supporting assembly. Opposite walls 68 of the housing are formed with bearings 69 for receiving the rod and a pulley 70 is adapted to be received by the flattened end 53a of the rod for non-rotatable engagement. Means for rotating the rod 52 and the couplings mounted on it are provided by a belt 71 and a motor 72. Spraying of the primer is effected through nozzles 75 connected with a conduit 76 receiving the primer 77 under pressure from a reservoir indicated diagrammatically at 78. It will be understood that appropriate known means (not shown) for forcing the coating through the nozzles under pressure are provided.

Figure 5:
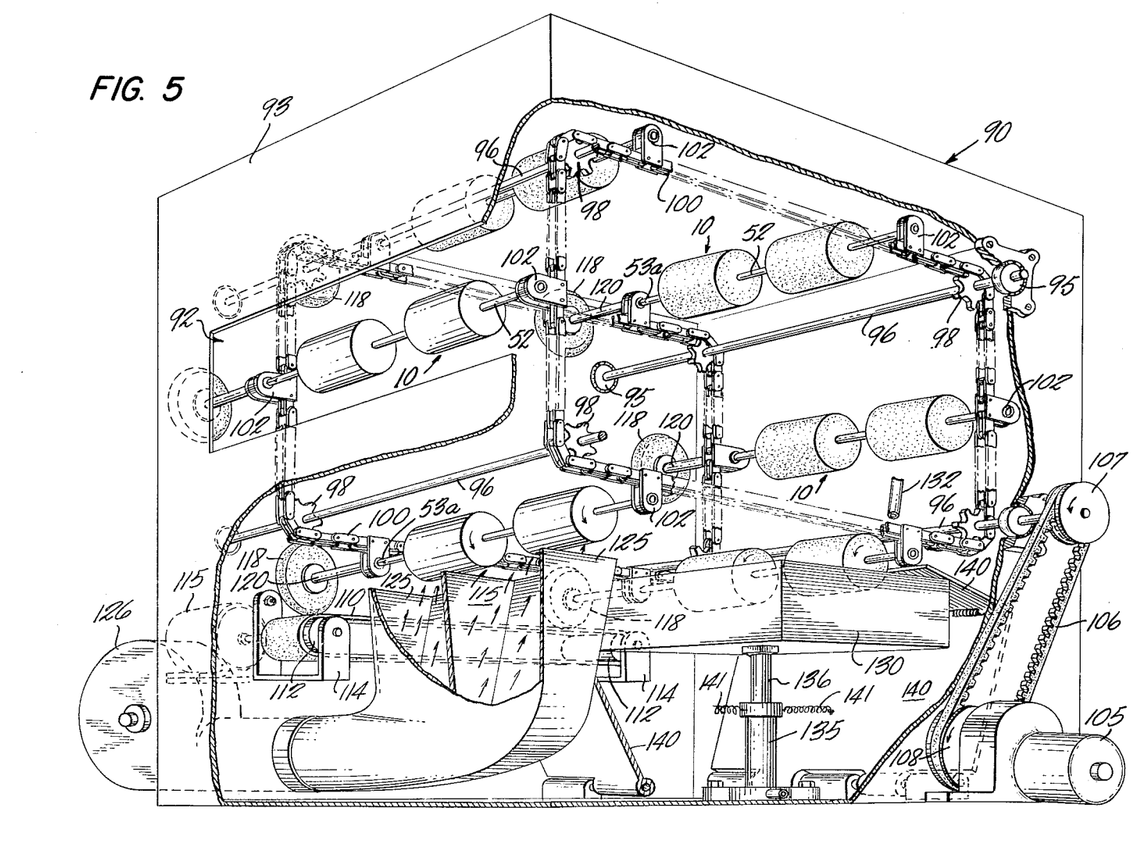
FIG. 5 is a perspective view, with parts cut away to show details of construction, of a multiple-station unit for heating, coating, and cooling the couplings.

After the couplings have had the primer coat applied and have had caps placed over the bolt nuts, they are heated and coated with bituminous enamel and cooled as described above. Here, again, any convenient apparatus may be used for this purpose but there is shown in FIG. 5 an apparatus which is particularly suitable. As seen in FIG. 5, the apparatus comprises an enclosed chamber 90 having an opening 92 in an end wall 93. Mounted in bearings 95 are four chain drive rods 96 provided with sprockets 98 which engage chain conveyors 100. The chain conveyors 100 are provided with supporting brackets 102 adapted to receive the ends of supporting rods 52 as seen in FIG. 5. The chain conveyor is driven by any suitable power means such as the motor 105 which drives the rods 96 through a belt 106 and pulleys 107 and 108. In order to rotate the rods 52 and the couplings which they support when the couplings are being moved through the apparatus, there is provided a continuous belt 110 movable over rollers 112 supported in brackets 114, one of the rollers being driven as by the motor 115. Engageable with the belt 110 is a rubber tired wheel 118 carried by a shaft 120 which has an end shaped to receive the flattened end 53a of the rod 52 when the rod is mounted in the brackets 102.

Disposed adjacent the lower portion of wall 93 under the opening 92 are ducts 125 connected to a blower 126 which in turn is connected to a source of heated air or gases (not shown), the blower being adapted to blow the air or gases upon the couplings as they are suspended over the ducts 125. In the lower portion of the apparatus, there is also provided a tank 130 adapted to contain the coal-tar enamel 131 and to be refilled as the enamel is used up from an inlet 132. The tank 130 is mounted for vertical reciprocating movement and for this purpose there is suitably provided a fluid cylinder 135 having a piston 136 connected to the tank. A cover 140, which is suitably hinged, and formed from two opposite portions, is also provided to extend across the tank when it is in its lowered position, the cover portions being acted upon by springs 141.

The chain conveyor 100 is driven in the arrangement shown in FIG. 5 in a counter-clockwise direction so that the couplings are transported from a first station which corresponds to the position opposite the openings 92 at which they are loaded into the apparatus to a second station at which they lie above the ducts 125 and are heated by the gases blown upwardly from the ducts while being rotated. From the heating station the couplings are then transported to a position above the tank 130 and while they are rotated in this position, the tank is adapted to be raised so that the couplings are at least partially immersed and become completely coated as they are rotated. When the tank 130 is lowered, the couplings continue to rotate above the tank and they are then conveyed to the right, then upwardly, then to the left and finally reach the last station which corresponds to a position opposite the opening 92 from which the assembly is removed from the apparatus.

It will be understood from the foregoing that the movement of the couplings through the machine is intermittent with the couplings moving from station to station in a predetermined time sequence, e.g., 8 seconds travel time between stations. In a typical embodiment, for example, a 40 in. movement occurs between stations and the time at each station will depend upon the size of the coupling. For example, a 2 in. coupling would dwell at a station for 1 minute and 20 seconds while a 12 in. coupling would dwell for 2 minutes and 10 seconds. The couplings do not stop between the heating station above the ducts 125 and the dipping station above the tank 130. In the case of a 2 in. coupling, for example, a complete cycle in the apparatus of FIG. 5 would be as follows:

The coupling is loaded, travels 8 sec. to the heating station above the ducts 125, dwells 1 minute 20 seconds at the heating station and subsequently goes to four other stations with an 8 second travel time between stations and a 1 minute 20 second dwell time at each station. The station following the heating station is the dipping station, as above mentioned, and the three other stations are at the back and at the top of the housing 90 with the last station, as mentioned, corresponding to a position at which the couplings are unloaded from the apparatus.

At the station above the enamel tank at which the enamel coating is applied, the following timing sequence is illustrative. When the coupling assembly reaches the station over the tank 130, the cover is withdrawn in 7 seconds, the tank rises in 3 seconds and remains in its uppermost position with the couplings partially, e.g., one-third, immersed in the molten enamel coating for 4 seconds while the coupling rotates, e.g., at 60 r.p.m. The tank 130 is then lowered in 3 seconds and the cover moves into place over it. The couplings continue to rotate for the remainder of their dwell time at the coating station and are then moved to the next station as previously described.

In will be understood that the intermittent movement of the conveying chain 100 and the reciprocating movement of the tank 130 and its cover are readily effected in conventional manner by the use of suitable controls such as limit switches, timing relays, and the like, which form no part of the present invention and are not shown in the drawings. Similarly, suitable insulation (not shown) is applied to the tank 130 and to other members where maintenance of heat is desired.

The movement of the couplings on the supporting assembly, such as shown in FIG. 4, and to and from the heating and dipping apparatus, such as shown in FIG. 5, may be effected by an overhead conveyor (not shown) which may be similar in construction to the conveyor 100, or the supporting assembly may be handles manually. The brackets and bearings in the spray apparatus and in the conveyor of the apparatus of FIG. 5 have sufficiently large apertures for receiving the ends of rod 52 that the supporting assembly may be easily mounted in these two units by first inserting one end of the rod and then the other, and any conveyor for transporting the couplings outside these units is suitably constructed in like manner.

In any case, after the couplings are unloaded from the housing 90 or like apparatus in which they have been given their final coating of bituminous enamel and allowed to cool partially, the caps 78 are removed and the couplings are then set aside to cool to room temperature. At this point they are removed from the supporting assembly comprising the rod 52 and the plugs 60 and they are then packaged for shipment. A suitable package means, for example, may comprise an elongated tubular member of corrugated cardboard which completely encloses the coupling and has outwardly-extending ends which may be retroverted into the pipe apertures at the ends of the coupling. Obviously other packaging means may be employed.

It will be understood that the two-phase coating provided by the above-described process may be used as the sole covering for the surface treated or, in the case of pipes, it may be combined with pipe wrappings of conventional type well-known in this field such as wrappings of asbestos felt, kraft paper, glass fiber webs, and the like. The wrappings are suitably applied over the outer coating of the pipe enamel and the wrappings may be coated with a further coating of pipe enamel and then additional wrappings applied to provide the so-called double coat, double wrap.

It will also be understood that the above-described two-phase coating may be combined with other coatings if desired. For example, the coupling parts may be first coated before they are coated with the primer composition with a thermosetting coating composition such as phenolic resin coating composition as described in the Structural Steel Painting Council Handbook. This first coating is allowed to dry to the touch but not to set completely before the coupling is assembled and the release agent applied and before application of the primer coating, e.g., the coal-tar pitch epoxy resin composition. When the coal-tar enamel is subsequently applied as the outer coating, the heat from the molten bitumen will simultaneously cause both the phenolic resin coating and the epoxy resin coating to cure completely. Furthermore, while application of the primer composition is advantageously and preferably effected by means of spraying, as described above, it is possible within the scope of this invention to use other methods of application known in the art of coating, such as brush application, roller application, and the like. The same is true with respect to the application of a first coating such as a phenolic resin coating composition mentioned above.

While an assembly comprising two couplings has been shown in FIG. 3 and described above, it will be clear that a single coupling, or more than two couplings, may be handled at a time, depending upon the axial length of the couplings in relation to the length of rod 52. When more than two couplings are handled, additional springs and plugs are suitable provided.

The coal-tar heavy oil described above, which is characterized by a low-shear-strength, is preferably employed as the release agent because of its effectiveness and its compatibility with the coal-tar-containing coatings. However, other low-shear-strength oils which do not adversely affect the coating may be employed. The gaskets and the release agent cooperate to make it possible for the fully coated coupling to be installed merely by stabbing the pipes in it and tightening the nuts. The gasket fills the gasket release between the end of the sleeve and the follower and prevents the entry of the coating into this portion of the coupling, and the release agent permits relative movement between closely adjacent coated portions of the coupling such as the bolts in relation to the followers and sleeve, and the followers in relation to the sleeve. The primary purpose of the caps 148 is to keep the nuts free from the final enamel coating to receive a wrench. It is for this reason that the caps are applied at the point indicated and they are removed before the outer coating has fully hardened. After the coupling has been installed, the nuts and the free ends of the bolts may be "touched-up" with enamel if desired, although this is generally not necessary. From an electrical standpoint, all metal parts of the coupling are in electrically conducting relationship when the bond wire 42 and the armoured gaskets are in position since the tightened nuts bite through the coating into the follower and thus provide an electrically-conductive path between the followers and the bolts. The preassembled, precoated coupling of this invention makes such a construction particularly feasible since the bond wire is applied before the coatings are applied and the difficulties of applying a bond wire in the field are avoided.

The following examples will serve more fully to define the invention but it is understood that they are intended for illustrative purposes only and are not to be interpreted as limitative of the invention.

EXAMPLE 1

The metal parts of the two pipe couplings of the type shown in FIGS. 1 and 2 and of a size suitable for the interconnection of 2 in. pipe, each with a wall thickness of 5/32 in. and weighing 9 pounds are thoroughly washed and rubbed with xylene and are then sand blasted to prepare a clean surface for coating, both the interior and the exterior of the coupling parts being treated in this manner. The threaded ends of the bolts are then dipped in a release agent consisting of a coal-tar heavy oil having the characteristics set forth above. These couplings parts and suitable gaskets are then assembled to form two completely preassembled couplings, a bond wire 42 is welded in place between the coupling sleeve and the follower, and these couplings are then mounted on a supporting assembly as shown in FIG. 3. A bath of a coal-tar pitch-epoxy resin coating composition is prepared by introducing into a 25-gallon tank, such as the reservoir 78, 20 gallons of an epoxy resin preparation having the following composition:

| | |
|---|---|
| Epoxy ether resin from bis-phenol A and epichlorhydrin (melting point 9° C. and epoxy value 0.50), weight percent | 31 |
| Aromatic high-flash naphtha, weight percent | 200 |
| Coal-tarch pitch, weight percent | 33 |
| Talc, weight percent | 16 | to which is added 1 gallon of diethylene triamine as curing agent. The coupling assembly is mounted in a spray booth such as shown in FIG. 4, and within 15 minutes after the curing agent has been added, the composition is sprayed at room temperature upon all surfaces of the couplings to provide a thickness of about 5 mils. There is also prepared in dipping tank 130 a supply of 30 gallons of a water works enamel meeting the AWWA C203–4 specification set forth above, sold under the name Waterworks Enamel, and having the following characteristics:

| | |
|---|---|
| Specific gravity at 25 C. | 1.40–1.50 |
| Softening point (degrees F. ASTM D–36) (minimum) | 220 |
| Penetration ASTM–D–5: | |
| 100 g. 5 sec., 77 F. | 10–20 |
| 200 g. 5 sec., 77 F. | ----- |
| 50 g. 5 sec., 115 F. | 15–55 |
| Ash, mineral filler, percent by weight | 25–35 |
| Sag test: | |
| 7 hrs. at 120 F. | ----- |
| 7 hrs. at 140 F. | ----- |
| 24 hrs. at 160 F. (maximum) ______inch__ | 1/16 |
| 24 hrs. at 180 F. | ----- |
| Cold cracking test: | |
| 5 hrs. at 30 F. | ----- |
| 5 hrs. at 0 F. | ----- |
| 5 hrs. at −10 F. | ----- |
| 5 hrs. at −20 F. | None |
| Spark test: | |
| 10,000 volts | ----- |
| Low amperage | None |

This enamel is heated to 470° F. to render it fluid. After the coal-tar pitch epoxy resin composition has been applied to the couplings, release agent is applied in the space between the coupling sleeve and the followers and the nuts are covered with caps and the coupling assembly is transferred to the housing 90 and mounted upon conveyor 100 on which it is moved to the heating zone above ducts 115 where it is subjected for 1½ minutes to the action of air containing natural gas combustion products at a temperature of 625° F. The thus-coated couplings are then transferred to the station above the dippings tank 130 and the tank is raised by the hydraulic jack to the position shown in FIG. 5 in which the rotating couplings are partly immersed in the body of heated water enamel in the dipping tank for 2.8 seconds and the dipping tank is then lowered and the couplings rotated in the air above the dipping tank which is at a temperature of 225° F. for about 1½ minutes until the outer coating of waterworks enamel has congealed sufficiently that it no longer runs. The couplings are then passed through the cooling stations at the back and at the top of the housing 90 and the coupling assembly is then removed and allowed to cool to room temperature, which requires about 30 minutes, the caps on the bolt ends being removed as soon as the assembly is withdrawn from the housing.

EXAMPLE 2

The procedure of Example 1 is repeated, using coupling parts of a coupling such as shown in FIGS. 1 and 2 constructed for 6 in. pipe, having a wall thickness of ¼ inch and a weight of about 25 pounds, the metal parts of the couplings being first coated with a phenolic resin coating composition before application of the release agent and the primer. This phenolic resin composition is sold under the trade name Royston Vinachrome A–908 by Royston Laboratories, Inc., Blawnox, Pittsburgh 38, Pennsylvania. This composition is a liquid having a Zahn #2 viscosity of 55 seconds.

EXAMPLE 3

The procedure of Example 1 is repeated, using a coal-tar epoxy resin primer having the following composition:

| | |
|---|---|
| Epoxy ether resin from bis-phenol A and epichlorhydrin (melting point 25° C. and epoxy value 0.64), weight percent | 43.5 |
| Aromatic solvent (Wylene), weight percent | 13.0 |
| Coal-tar pitch, weight percent | 43.5 | to which are added ⅕ parts of diethylene triamine as curing agent. The coal-tar enamel used for the final coating is a "wide-range enamel" meeting the specification set forth above sold under the name Plasticized Enamel, and having the following characteristics:

| | |
|---|---|
| Specific gravity at 25 C. | 1.40–1.50 |
| Softening point (degrees F. ASTM D–36), (minimum) | 220 |
| Penetration ASTM–D–5: | |
| 100 g. 5 sec., 77 F. | 7–11 |
| 200 g. 5 sec., 77 F. | ----- |
| 50 g. 5 sec., 115 F. | 14–28 |
| Ash, mineral filler, percent by weight | 20–25 |
| Sag test: | |
| 7 hrs. at 120 F. | ----- |
| 7 hrs. at 140 F. | ----- |
| 24 hrs. at 160 F. (maximum) ______inch__ | 1/16 |
| 24 hrs. at 180 F. | ----- |
| Cold cracking test: | |
| 5 hrs. at 30 F. | ----- |
| 5 hrs. at 0 F. | ----- |
| 5 hrs. at −10 F. | ----- |
| 5 hrs. at −20 F. | None |
| Spark tests: | |
| 10,000 volts | ----- |
| Low amperage | None |

This enamel is heated to 500° F. to render it fluid. The couplings are immersed in the body of heated enamel in the dipping tank 130 for 5 seconds and are then rotated in the air above the dipping tank for about 90 seconds in passing to the final station until the outer coating of enamel has congealed sufficiently that it no longer ran. The cooling of the couplings to room temperature requires about 2 hours.

EXAMPLE 4

The procedure of Example 2 is repeated with coupling parts for a coupling for 12 in. pipe having a wall thickness of ¼ in. and a weight of about 47 pounds. The phenolic resin coating and the release agent are the same as used in Example 2 but the coal-tar epoxy resin composition had the following composition:

| | |
|---|---|
| Epoxy ether resin from bis-phenol A and epichchlorhydrin (melting point 9° C. and epoxy value, 0.50) weight percent | 31 |
| Aromatic high-flash naphtha, weight percent | 20 |
| Coal-tar pitch, weight percent | 33 |
| Talc, weight percent | 16 | to which is added 1 gallon of diethylene triamine as curing agent. The bituminous enamel is a water works enamel meeting the AWWA C203–4 specification set forth above, sold under the name Waterworks Enamel, and having the following characteristics:

| | |
|---|---|
| Specific gravity at 25 C. | 1.40–1.50 |
| Softening point (degrees F. ASTM D–36) (minimum) | 220 |
| Penetration ASTM–D–5: | |
| 100 g. 5 sec., 77 F. | 10–20 |
| 200 g. 5 sec., 77 F. | ----- |
| 50 g. 5 sec., 115 F. | 15–55 |
| Ash, mineral filler percent by weight | 25–35 |
| Sag test: | |
| 7 hrs. at 120 F. | ----- |
| 7 hrs. at 140 F. | ----- |
| 24 hrs. at 160 F., (maximum) ________inch__ | 1/16 |
| 24 hrs. at 180 F. | ----- |
| Cold cracking test: | |
| 5 hrs. at 30 F. | ----- |
| 5 hrs. at 0 F. | ----- |
| 5 hrs. at −10 F. | ----- |
| 5 hrs. at −20 F. | None |
| Spark test: | |
| 10,000 volts | ----- |
| Low amperage | None |

This enamel is heated to 470° F. to render it fluid. In the heating zone the couplings are subjected for 3½ minutes to the action of air containing natural gas combustion products at a temperature of 625° F. The thus-coated coupling is then immersed in the body of heated water works enamel in the dipping tank for 8 seconds and then rotated in the air above the dipping tank which is at a temperature of 250° F. for about 1½ minutes until the outer coating of water works enamel has congealed suficiently that it no longer ran. The coupling is then removed and allowed to cool to room temperature which requires about 2 hours.

What I claim and desire to secure by Letters Patent is:
1. A factory preassembled pipe coupling ready to be shipped and subsequently installed in a pipe line without disassembly to connect two adjoining pipe sections of a designated predetermined standard size, comprising in combination a tubular sleeve adapted to receive end portions of said pipe sections to be joined and having end portions flared in an acute angle to the axis of said sleeve to define in part a gasket recess at each end of said sleeve and terminating in end edges; an annular gasket of firm elastomeric material received in each gasket recess and having an approximately cylindrical aperture to receive the respective pipe section, a conical surface engageable with the inner surface of the corresponding flared end portion of said sleeve, a shoulder engageable with the end edge of said flared end portion of the sleeve, an approximately cylindrical outer peripheral surface having a diameter slightly greater than the maximum diameter of said flared end portion of the sleeve, and an outer end face; a follower ring at each end of said sleeve, each of said follower rings having a pipe-receiving aperture, a radially outwardly projecting flange portion, an inner end surface engaging the outer end face of the gasket and an inner peripheral surface fitting the outer periphery of said gasket snugly without appreciable play therebetween, and bolts extending between said flange portions of the follower rings and tightened sufficiently to hold said gaskets securely between said flared sleeve ends and said follower rings, said gaskets being held substantially centered relative to said sleeve by engagement with said flared sleeve ends and said follower rings being held centered relative to said gaskets and said sleeve by the snug fit of said follower rings on the peripheries of said gaskets, the pipe apertures of said gaskets and follower rings being thereby aligned, said gaskets having pipe apertures with a diameter in relaxed condition which is substantially equal to the diameter of the pipe apertures of said follower rings and is greater than the outside diameter of said pipe sections by an amount up to 3% of the outside diameter of said pipe sections, and not more than one half an inch whereby said factory preassembled coupling is installed solely by stabbing said pipe sections into it and thereafter further tightening said bolts to provide a completely fluid-tight pressure seal, said gaskets being secured in centered position between said flared sleeve ends and follower rings during the stabbing of said sections into the coupling against displacement by engagement by said pipe sections.

2. A factory preassembled pipe coupling according to claim 1, further comprising an electrically conductive flexible conductor secured and electrically bonded only to said tubular sleeve and to the follower rings at each end of said sleeve after said coupling has been assembled and before it has been installed in a pipe line, said conductor being sufficiently flexible to permit axial movement of said follower rings relative to said sleeve during subsequent installation of said coupling.

3. A factory preassembled pipe coupling according to claim 2, in which an annular metallic helix in a toe portion of each gasket defined by the intersection of said conical surface and said pipe-receiving aperture provides an electrically conductive bridge between the pipe sections and said tubular sleeve.

4. A factory preassembled pipe coupling according to claim 1, further comprising a continuous corrosion protective coating applied to exposed surfaces of said sleeve, follower means and bolts after assembly and before installation of the coupling and release means underlying said coating on threaded portions of said bolts and between said sleeve and follower rings to facilitate tightening of said bolts and axial movement of said follower rings relative to said sleeve during subsequent installation of said coupling in a pipe line.

5. A factory preassembled pipe coupling according to claim 4, in which said protective coating comprises a primer coating consisting of a cured composition containing coal-tar pitch and epoxy resin.

6. A factory preassembled pipe coupling according to claim 5, in which said undercoating is composed essentially of 15 to 50 parts by weight epoxy resin and 50 to 85 parts by weight coal-tar pitch.

7. A factory preassembled pipe coupling according to claim 5, in which said coating further comprises a superposed coating of bituminous enamel over said primer coating, said enamel having a softening point of at least 190° F., a penetration at 77° F. of from 10 to 20 and an ash value of at least 20% by weight.

8. A factory preassembled pipe coupling according to claim 1, in which said shoulder comprises a discontinuous annular shoulder composed of circumferentially spaced arcuate shoulder sections.

9. A factory preassembled pipe coupling ready to be shipped and subsequently installed in a pipe line without disassembly to connect two adjoining pipe sections of a predetermined standard nominal size, comprising in combination a tubular sleeve adapted to receive end portion of maximum pipe of said nominal size and having opposite end portions flared at an angle of the order of 30° to the axis of the sleeve to define in part a gasket recess at each end of said sleeve and terminating in end edges; an annular gasket of firm elastomeric material received in each gasket recess and having an approximately cylindrical aperture to receive the respective pipe section, a conical surface engageable with the inner surface of the corresponding flared end portion of said sleeve, a shoulder engageable with said end edge of said flared portion of the sleeve, an approximately cylindrical outer peripheral surface having a diameter slightly greater than the maximum diameter of said flared portion of the sleeve and an approximately radially extending outer end face; a follower ring at each end of said sleeve, each of said follower rings having a pipe receiving aperture having a diameter slightly greater than that of maximum pipe of said nominal size, a radially outwardly projecting flange portion, an inner end surface engaging the outer end face of the respective gasket and an inner peripheral surface fitting the outer periphery of said gasket snugly without appreciable play therebetween, and bolts extending between said flange portions of the follower rings and tightened sufficiently to hold said gaskets securely in place between said flared sleeve ends and follower rings, said gaskets being held substantially centered relative to said sleeve by engagement with said flared sleeve ends and said follower rings being held substantially centered relative to said gaskets and said sleeve by the snug fit of said follower rings on the peripheries of said gaskets, the pipe apertures of said gaskets and follower rings being thereby aligned, said pipe-receiving aperture of each gasket having a diameter in relaxed condition of the gasket which is substantially equal to the diameter of the pipe apertures of said follower rings and is between 1% and 3% greater than the mean outside diameter of pipe of said nominal size and not more than one half inch greater than said mean diameter, whereby said factory preassembled coupling is installed solely by stabbing said pipe sections into it and thereafter further tightening said bolts to provide a completely fluid-tight pressure seal, said gaskets being secured in centered position between said flared sleeve ends and follower rings during said stabbing of said pipe sections in to the coupling against displacement by engagement by said pipe sections.

10. A factory preassembled pipe coupling according to claim 9, in which said pipe-receiving aperture of each gasket tapers inwardly at an angle of 2° to 5° to the longitudinal axis of the coupling, said pipe-receiving aperture having a minimum diameter at the axially inner end of the gasket just sufficient to receive a maximum pipe of said nominal size.

References Cited by the Examiner
UNITED STATES PATENTS

| | | | |
|---|---|---|---|
| 1,196,785 | 9/16 | Johnson | 285—369 X |
| 1,984,806 | 12/34 | Pffeferle | 277—28 X |
| 2,021,745 | 11/35 | Pffeferle et al. | 285—369 X |
| 2,347,897 | 5/44 | Febrey | 339—222 X |
| 2,701,730 | 2/55 | Risley et al. | 285—269 X |
| 2,999,124 | 9/61 | Burke | 174—78 X |
| 3,024,130 | 3/62 | Kish | 117—161 |

DARRELL L. CLAY, *Primary Examiner.*